March 3, 1931.  J. W. WARD  1,794,745
RESTAURANT UNIT
Filed Jan. 2, 1929   2 Sheets-Sheet 1
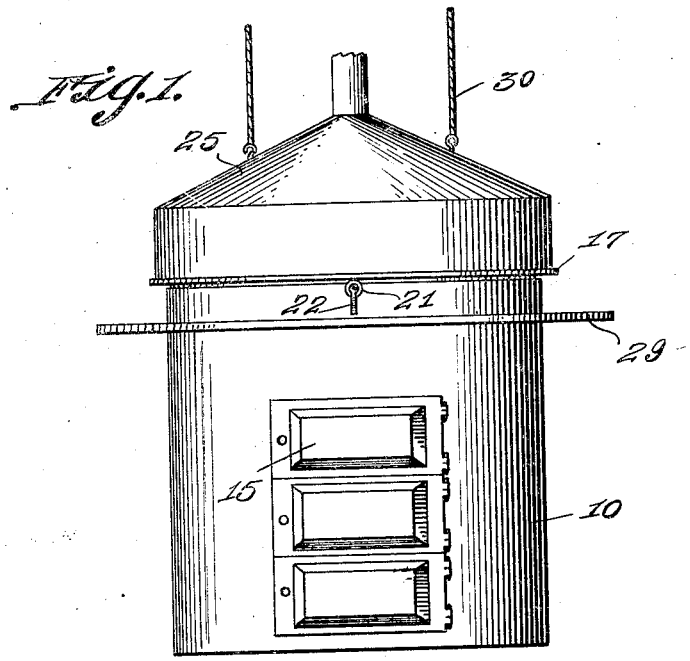
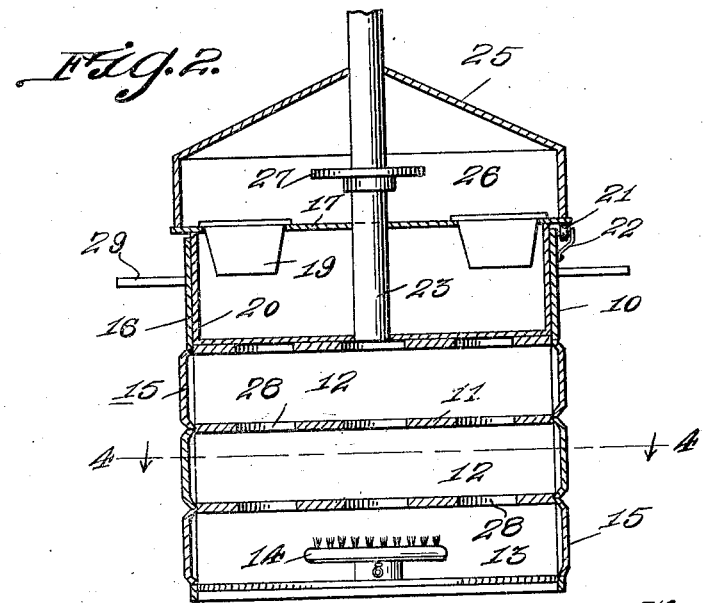

March 3, 1931.  J. W. WARD  1,794,745
RESTAURANT UNIT
Filed Jan. 2, 1929  2 Sheets-Sheet 2
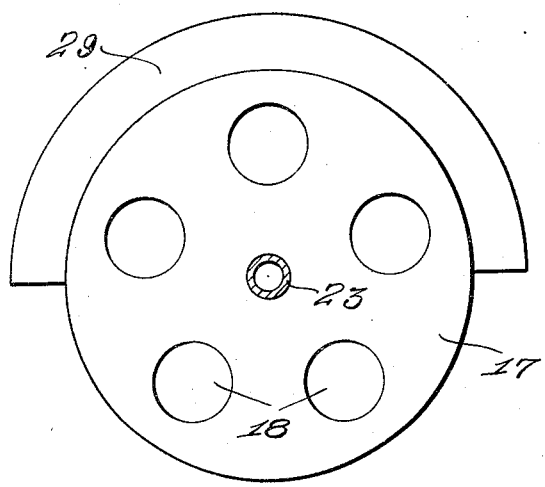
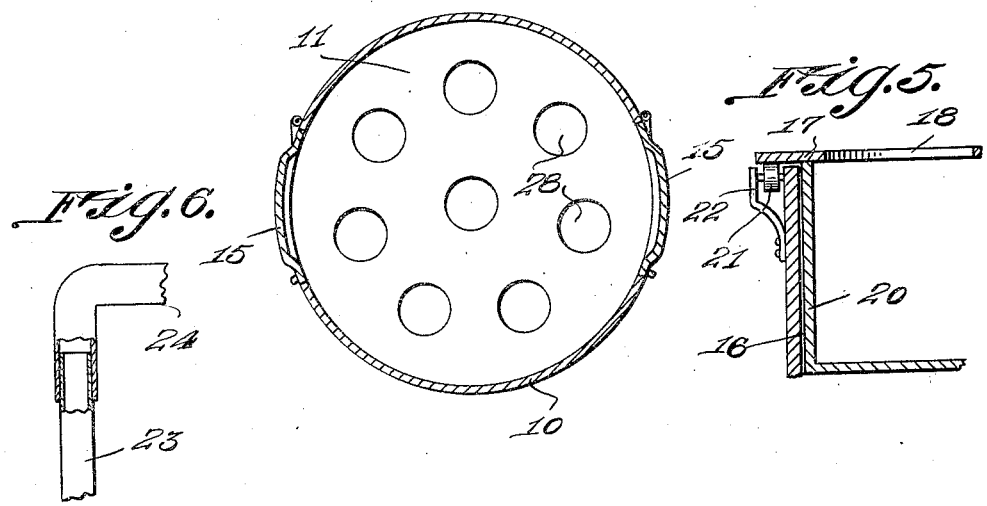
John W. Ward, INVENTOR
BY Victor J. Evans ATTORNEY Patented Mar. 3, 1931

1,794,745

UNITED STATES PATENT OFFICE

JOHN W. WARD, OF AKRON, OHIO

RESTAURANT UNIT

Application filed January 2, 1929. Serial No. 329,921.

This invention relates to steam tables, an object of the invention being to provide a table constructed so as to accommodate a maximum number of dishes with the latter arranged in such manner that an attendant may conveniently reach any dish without leaving his position.

Another object of the invention is to combine a steam table with a cooking stove, so that articles of food may be cooked and the heat otherwise wasted utilized to keep previously cooked food warm.

Another object of the invention is the provision of a combined cooker and steam table which includes a number of separate cooking compartments having a common source of heat, and a steam table positioned above said compartments to receive heat therefrom so as to provide an economically operated unit especially designed for restaurant use.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention.

Figure 2 is a vertical sectional view.

Figure 3 is a plan view of the steam table with the vent pipe in section.

Figure 4 is a section on line 4—4 of Figure 2.

Figure 5 is an enlarged fragmentary vertical section illustrating the manner of rotatably mounting the steam table.

Figure 6 is a fragmentary elevation partly in section showing a means for connecting the vent pipe with the outlet flue.

Referring to the drawings in detail wherein like characters of reference denote corresponding parts, the invention which combines a stove and steam table includes a housing 10. This housing is divided by means of horizontal partitions 11 into separate oven or cooking compartments 12 and a burner compartment 13, within which is housed a burner 14. Obviously, some other source of heat may be utilized in the place of the burner. The housing is provided with diametrically positioned doors 15 for each compartment, so that access may be conveniently had to the oven or compartments.

The topmost partition 11 is spaced downwardly from the upper edge of the housing 10 so as to provide a compartment 16 to receive the lower portion of a steam table. This steam table comprises a top 17 which is provided with openings 18 to removably receive dishes or receptacles 19 which are adapted to contain articles of food to be served. In addition, the steam table is provided with a hollow cylindrical depending portion or drum 20 which is removably and rotatably received within the compartment 16 and as the housing 10 is cylindrical in shape, the portion 20 of the steam table will conform thereto.

In order to provide for conveniently rotating the steam table, the housing 10 is provided with circumferentially spaced rollers 21 which are mounted within brackets 22 and which project slightly above the upper edge of the housing so that the top 17 of the table will freely rotate thereon. Of course, the bottom and side walls of the portion 20 of the table are spaced sufficiently from the housing and the topmost partition 11 to prevent frictional contact.

Extending upward through the portion 20 of the table and through the top thereof is a vent pipe 23 and this pipe is adapted for connection with a suitable outlet flue. For this purpose the pipe 23 may telescope within a pipe section 24 which enters the flue so that the pipe section 23 may rotate within the lower end of the section 24 to permit the table to freely rotate.

The invention further includes a cover 25 which is slidable and guided upon the pipe 23 and which normally may rest upon the top of the table so as to provide a warming chamber 26. The pipe 23 may also serve to support an annular shelf 27.

The partitions 11 may be provided with openings 28 so that heat may pass from one oven or cooking compartment to another.

Extending circumferentially of the housing 10 is a horizontally disposed work table 29 for the convenient use of the attendant. In addition, the cover 25 may be provided with ropes or cables 30 and these ropes or cables may pass over suitable pulleys so that the cover may be conveniently handled.

The invention is susceptible of various changes in its form, proportions and minor details of construction and the right is herein reserved to make such changes as properly fall within the scope of the appended claims.

Having described the invention what is claimed is:

1. A stove including a circular housing divided into cooking compartments, a source of heat, a chamber near the top of the housing, a hollow cylindrical member rotatably and removably arranged in said chamber and having openings in its top to receive dishes or containers and defining a steam table, rollers supported upon the exterior of said housing and upon which the top of said table reposes, and a hollow cover for said table defining a warming chamber at the top of the table.

2. In combination, a stove including a circular housing divided into cooking compartments, a source of heat, a chamber near the top of the housing, a hollow cylindrical member removable from said chamber and having openings in its top to receive dishes or containers and defining a steam table, means to mount the table for rotation, a hollow cover for the table defining a warming chamber, and a shelf extending horizontally from and rigid with the housing and partly surrounding the latter.

In testimony whereof I affix my signature.

JOHN W. WARD.